J. W. HOUGHTELIN.
Car Starter.
No. 64,224.
Patented Apr. 30, 1867.
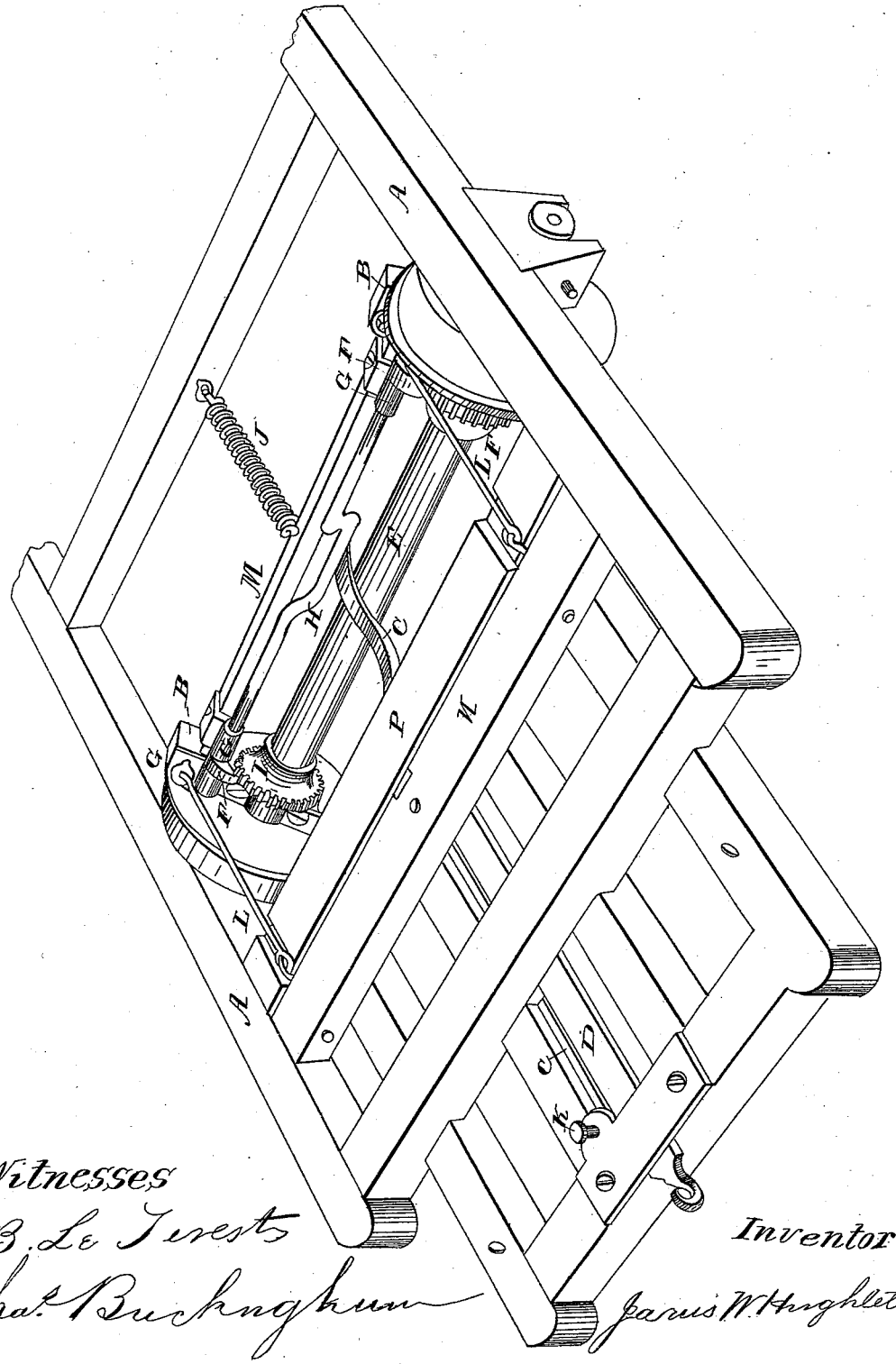
Witnesses
B. Le Verts
Chas. Buckingham
Inventor
James W. Houghtelin

United States Patent Office.

JARVIS W. HOUGHTELIN, OF DETROIT, MICHIGAN.

Letters Patent No. 64,224, dated April 30, 1867.

---

IMPROVED CAR-STARTING APPARATUS.

---

The Schedule referred to in these Letters Patent and making part of the same.

---

TO ALL WHOM IT MAY CONCERN:

Be it known that I, JARVIS W. HOUGHTELIN, of the city of Detroit, in the county of Wayne, and State of Michigan, have invented a new and improved Apparatus for Starting Cars or Vehicles of all kinds; and I hereby declare that the following is a full, clear, and exact description of the same, reference being had to the annexed drawings, making a part of this specification.

The object of this invention is to obtain a machine or apparatus that will assist the motive power in starting railway cars or other wheeled vehicles, which operation requires, under ordinary circumstances, a much greater per cent. of power to start than it does to keep it in motion when started. My invention, as per drawings, is attached to a street-railway car, which I will proceed to describe.

A A shows the frame of the car surmounted upon wheels, O O, the platform frame with the floors left off to show the apparatus. Upon the axle of the car are placed ratchet-wheels I I, firmly fastened, and at outside of said ratchets are hung loosely arms or levers B B; said levers are fastened loosely by boxes to axle. Cross-bar M connects the levers together, causing them to swing evenly and parallel to each other. F F are pawls fastened rigidly on rod H, which rod is hung in its place by boxes G G G G. L L are rods connecting slide-bar N with levers B. D is the draught-bar with hook to hitch team to at one end, and fastened at the other end to slide-bar N. C is a lever, reaching from foot-piece K, under crank-rod H, which lever has its fulcrum under rail P.

The operation is as follows: The team being attached to the hook of the draught-bar D, the driver wishes to use the starter; he puts his foot upon the standard K, which, through the action of lever C and crank-rod H, places the pawls F F in gear to and with ratchets I I. The team is started, which draws forward draught-bar D, slide-bar N, and levers B B and pawls F F being connected or in gear with ratchets I I. As the lever B B is drawn forward by connecting-rods L L attached to slide-bar N, it couples the whole together, and turns the axle, which has its wheels firmly attached, thereby moving the car as the team draws out the draught-bar D. Spring J is for the purpose of drawing back levers, pawls, &c., when the car stops, ready to use when wanted in starting. I will state that connecting-bar M will be located below the body of the car. The two levers B B are located near the wheels, so they may protrude through the floor and come under the seats out of the way. I would say further, that under several circumstances, where so great a leverage may not be required, the two levers may be put under the car at or near the centre of the axle, thereby doing away with slide-bar N by connecting draught-bar D direct with levers B.

I do not claim any particular number of ratchets and pawls or levers, but what I do claim, and desire to secure by Letters Patent, is—

1. The double levers B B pivoted on the axle near the wheels connected by the bar M, provided with the bent rod H and pawls F F, and operated from the draw-bar D, all as described and for the purpose set forth.

2. In combination with the above I claim the lifting-lever C, foot-piece K, and connections, as described and for the purpose specified.

JARVIS W. HOUGHTELIN.

Witnesses:
HENRY E. DOWNS,
J. FOSTER,